Nov. 8, 1966  H. F. RIETH  3,284,683
ELECTRICAL CAPACITOR AND METHODS OF FORMING THE CAPACITOR
Filed June 19, 1964  3 Sheets-Sheet 1
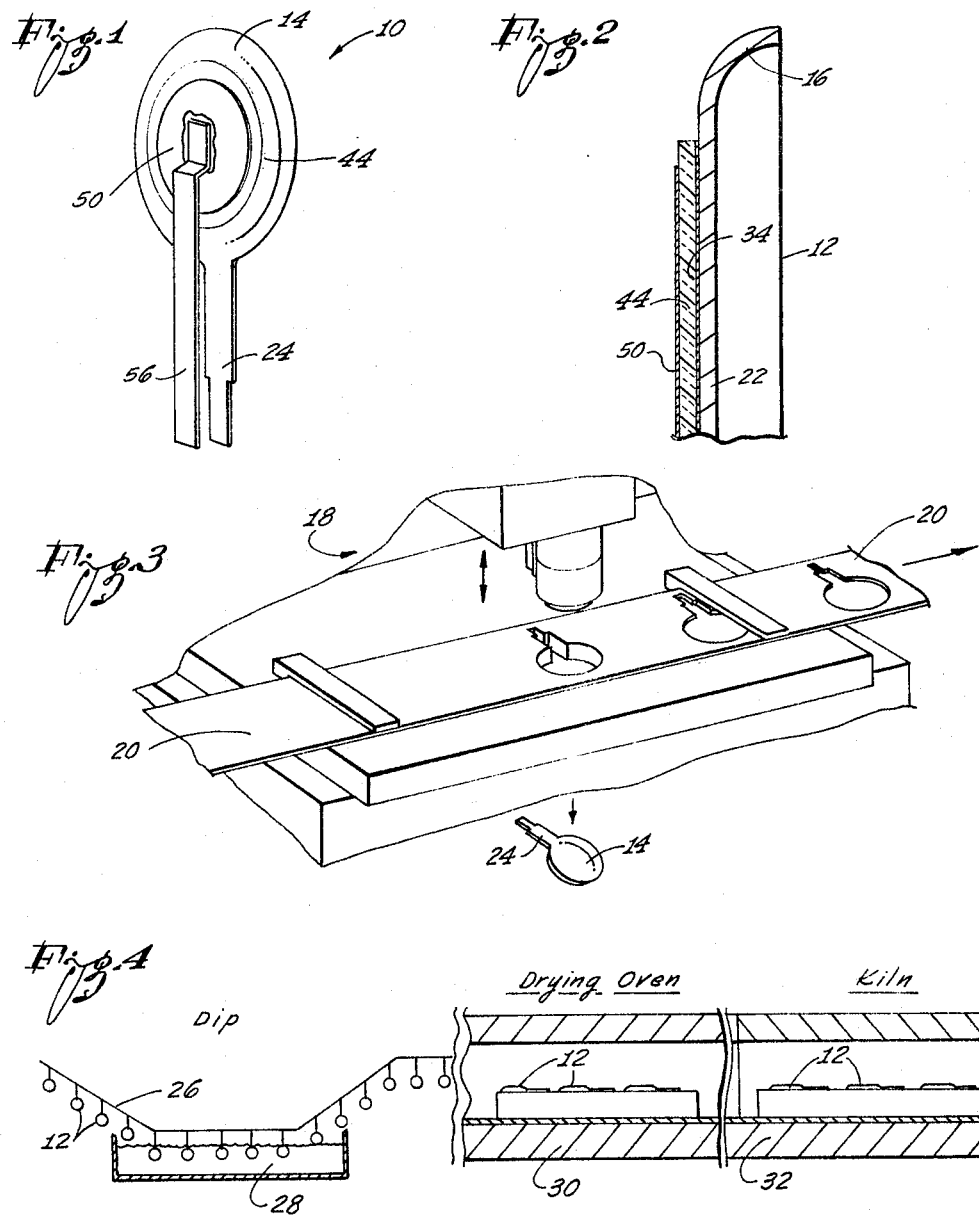
INVENTOR:
Harold F. Rieth
Attorneys Nov. 8, 1966  H. F. RIETH  3,284,683
ELECTRICAL CAPACITOR AND METHODS OF FORMING THE CAPACITOR
Filed June 19, 1964  3 Sheets-Sheet 2
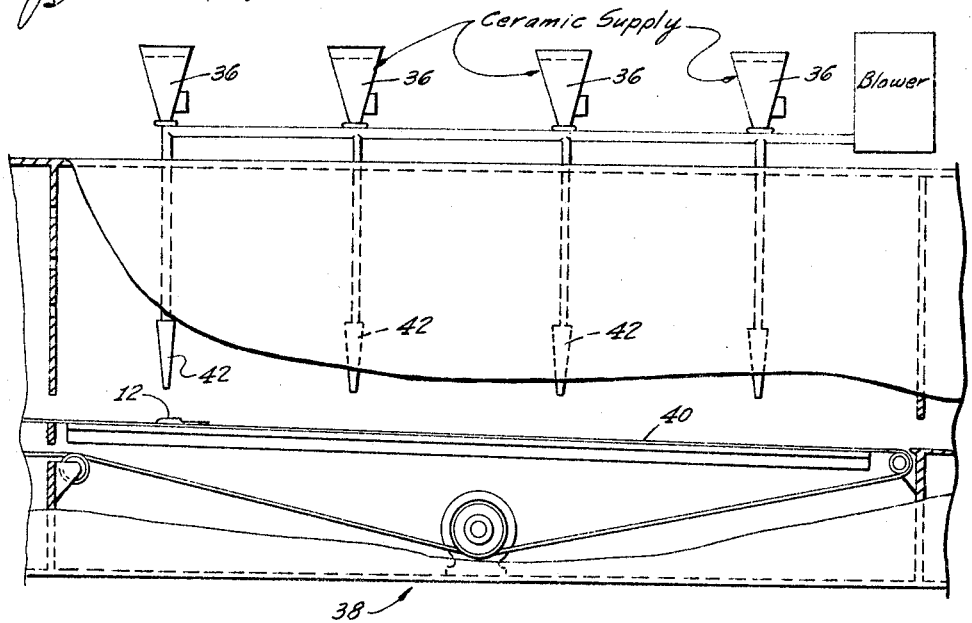
Fig. 5 (Spraying)
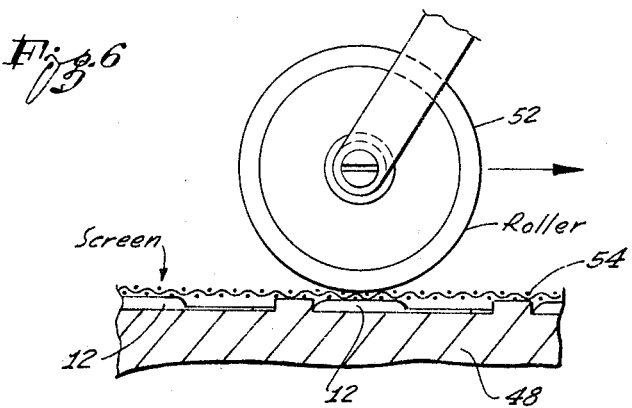
Fig. 6
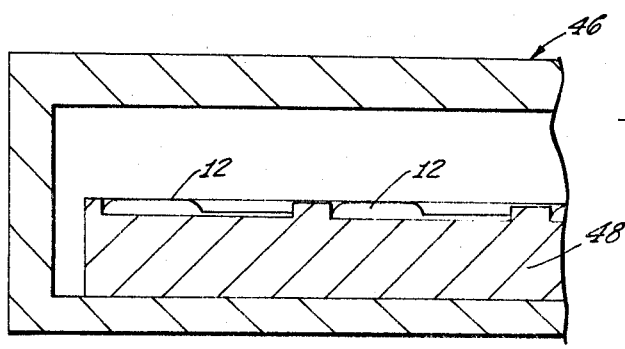
Fig. 7
INVENTOR:
Harold F. Rieth
By Smyth, Roston & Pavitt
Attorneys Nov. 8, 1966    H. F. RIETH    3,284,683
ELECTRICAL CAPACITOR AND METHODS OF FORMING THE CAPACITOR
Filed June 19, 1964    3 Sheets-Sheet 3

INVENTOR:
Harold F. Rieth

Attorneys

UNITED STATES PATENT OFFICE 3,284,683
ELECTRICAL CAPACITOR AND METHODS OF
FORMING THE CAPACITOR
Harold F. Rieth, Santa Monica, Calif., assignor to Packard-Bell Electronics Corporation, Los Angeles, Calif., a corporation of California
Filed June 19, 1964, Ser. No. 376,513
17 Claims. (Cl. 317—258)

The present invention relates to electrical capacitors and more particularly to electrical capacitors having a ceramic dielectric space and to a method of manufacturing such capacitors.

Electrical capacitors have pairs of electrically conductive surfaces separated from each other by a dielectric material. There are a wide variety of dielectric materials such as air, electrolytic fluids and solid materials such as mica, paper and ceramic that are commercially satisfactory for making condensers. However, each of these dielectric materials has certain inherent characteristics that limit the various dielectrics for use in capacitors that are particularly useful in particular types of applications.

For example, ceramics may be produced that have very high dielectric constants. This, in turn, permits ceramic capacitors to have large amounts of capacity in relatively small sizes. By decreasing the thickness of the ceramic spacer, the capacity may be further increased. In some types of circuits such as those employing transistors, the voltage differential across the ceramic spacer is on the order of 10 to 25 volts. A ceramic dielectric spacer which is only thick enough to withstand this low voltage is very thin and permits very large capacitors to be produced. The two plates of the capacitor may be deposited on the opposite sides of such a thin ceramic spacer by electrodeposition, spraying, etc. and to provide an extremely small capacitor having a very large capacity. However, since the ceramic material is extremely thin, the resultant capacitor does not have an appreciable amount of structural strength and, as a consequence such capacitors fail when subjected to normal mechanical forces.

In order to overcome the foregoing difficulties, capacitors such as disclosed and claimed in the U.S. Patent No. 3,130,475, issued April 28, 1964 in the name of Harold F. Rieth, entitled "Electrical Capacitor," and assigned, of record, to Packard Bell Electronics, have been provided. In such a capacitor, a support member has sufficient mechanical strength to prevent damage to the capacitor. A thin ceramic dielectric spacer is applied to at least one side of the metallic support member and a thin film of electrically conductive material is applied to the opposite side of the dielectric spacer.

In the process of bonding the ceramic material to the support member, it is necessary to heat the ceramic to a temperature on the order of 2,000 to 2,500° F. in order to vitrify the ceramic. As a consequence, the support member must include a high temperature material capable of withstanding temperatures which are far in excess of the temperature at which the ceramic vitrifies. For various reasons, it has been found that the most practical materials for the support member are high temperature stainless steels and particularly those stainless steels containing large quantities of nickel. When these stainless steel alloys are heated to temperatures of 2,000 to 2,500, appreciable quantities of contaminants such as gases, oxides, nickel, etc. may escape from the alloy and enter into the powdered ceramic material. If these contaminants are mixed into the ceramic as it becomes vitrified, the dielectric characteristics are materially altered or completely destroyed.

To eliminate contamination of the ceramic, the high temperature alloy has been decontaminated by heating the high temperature alloy to an elevated temperature in the presence of a material having a high affinity for the contaminating elements. This will be effective to remove the contaminants from the support member. After this operation, the ceramic material may be applied to the support member and vitrified thereon without contaminating the ceramic dielectric material.

Although the foregoing method and the resultant capacitors have been very satisfactory, some difficulties have been encountered in completely decontaminating the support member and maintaining the ceramic spacer free of any contaminates.

The present invention provides a new and improved ceramic capacitor and a method for producing such capacitors. This is accomplished by providing a chemically inert barrier between the support member and the ceramic material which will not decrease or otherwise alter the electrical characteristics of the capacitor but will prevent contamination of the dielectric material. In one operative embodiment of the present invention, a support member is provided which is a high temperature alloy having sufficient mechanical strength to support the condenser. A chemically inert material free of any contaminating substances, for example, a noble metal, is bonded onto the support member so as to produce a barrier for the passage of the contaminants. The ceramic dielectric material is then applied to the barrier and heated to a sufficient temperature to vitrify the ceramic into a dielectric layer. Since the inert barrier separates the dielectric material from the support member any contaminating substances present in the support member will be prevented from ever reaching the dielectric material and contaminating it. Following this, a second electrically conductive film is applied to the dielectric material to thereby produce a capacitor having an extremely high electric capacity and having a high degree of reliability.

These and other features and advantages of the present invention will become readily apparent from the following detailed description of a limited number of embodiments of the present invention, particularly when taken in connection with the accompanying drawings wherein like reference numerals refer to like parts and wherein:

FIGURE 1 is a perspective view of a capacitor embodying one form of the present invention;

FIGURE 2 is a transverse cross-sectional view, on a greatly enlarged scale, of a capacitor embodying one form of the present invention;

FIGURE 3 is a perspective view of an apparatus for carrying out an initial step in the process of forming capacitors.

FIGURE 4 is a view of several steps in an intermediate phase of forming the capacitor;

FIGURE 5 is a cross-sectional view of an apparatus for carrying out an additional step in the process;

FIGURE 6 is a cross-sectional view of an apparatus for carrying out an additional step in the process;

FIGURE 7 is a cross-sectional view of a kiln for carrying out several steps in the process.

Figure 8:
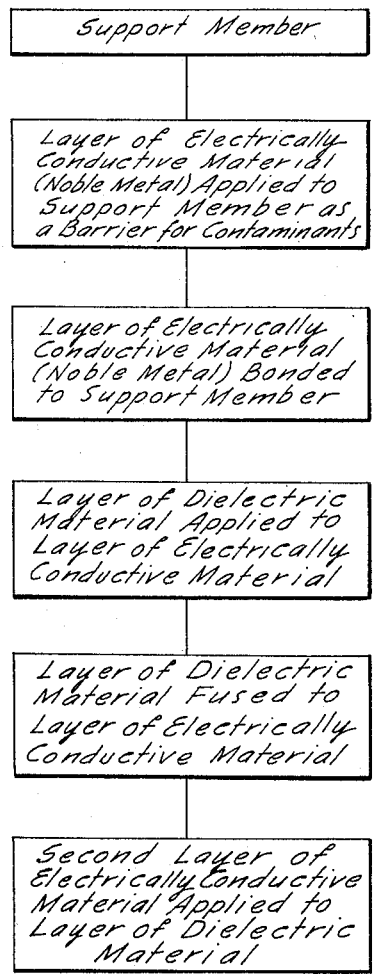
FIGURE 8 is a flow chart illustrating the succesive steps in the methods forming a part of this invention.

Referring to the drawings in more detail, the present invention is particularly adapted to be embodied in a capacitor 10 for use in an electrical circuit. Such a capacitor 10 includes two electrically conductive plates separated by a dielectric whereby an electrical charge may be stored on the two plates.

The capacitor 10 includes a support member 12 that forms the "backbone" of the capacitor 10. More particularly, the support member 12 provides a mechanical strength capable of withstanding all of the mechanical loads, etc. that the capacitor 10 will normally be subjected to. Although the support member 12 may be of any desired shape, it is illustrated as being round or a disc 14. The disc 14 may have a thickness, by way of example, on the order of 0.0025 inch. However, the edge 16 of the disc 14 may be rolled over to increase the mechanical strength of the support member 12.

As will become apparent subsequently, it is necessary for the support member 12 to withstand temperatures in the region of 2,500 to 3,000° F. Accordingly, the member 12 should include a high temperature alloy capable of withstanding such temperatures without variations in its characteristics. It will also become apparent that the support member 12 must have a thermal coefficient of expansion that is approximately the same as that of the dielectric ceramic employed. By way of example, this coefficient may be in the general region of $1.6 \times 10^{-5}$ inches/degrees C.

There are several materials that are particularly useful for this purpose. However, it has been found that the so-called high temperature stainless steel alloys are especially useful and particularly those with large quantities of nickel. By way of example, one alloy that has been successfully used for this purpose is sold under the trade name Inconel and consists of approximately 73% nickel, 15% chromium, 7% iron and 2½% titanium.

The support member 12 may be fabricated by any desirable means. However, as best seen in FIGURE 3, a punch 18 may be provided for stamping the members 12 from a continuous strip 20 of high temperature alloy. The punch 18 is effective to form the disc 14 with a flat or planar center 22 and the rounded periphery 16. In addition, under some circumstances, it may be desirable for the punch 18 to also provide a tab or strip 24 which extends from the side of the disc. This strip 24 will form an electrical contact or terminal which is electrically interconnected with the support member 12.

A support member 12 of the foregoing nature inherently includes several different contaminates which tend to be released from the support member 12 when it is heated to sufficiently high temperatures for vitrifying ceramic materials. For example, there are several gases, oxides, etc. that are released. Also, the nickel in the alloy tends to become available. If these contaminants are free to enter into the dielectric material while it is in the powdered state and heated to a sufficiently elevated temperature to vitrify, the resultant ceramic will be defective.

In order to avoid such contamination, a chemically inert barrier may be provided on the base or support member 12. Such a barrier will be impervious to the contaminates and, as a consequence, will maintain the contaminants confined within the support member 12. In order to apply such a barrier, the surface of the member and particularly the planar portion 22 may be initially sandblasted, degreased, etc. to provide a clean surface on the metal which is free of any foreign material such as oxide, dirt, grease, etc.

Following the cleaning operation, the barrier of chemically inert material may be applied to the clean surface 22. This is illustrated in the flow chart shown in FIGURE 8.

Although there are a wide variety of suitable chemically inert materials, it has been found that the so-called noble metals are very well adapted for this purpose. The so-called noble metals include metals such as gold, platinum, etc. These metals are chemically very stable and will not produce any material amount of contamination of the dielectric material. Also, they are effective to form an impervious layer which will prevent any contaminants passing therethrough.

By way of example, it has been found that platinum is well suited for this purpose and is easy to apply to the support member 12. A barrier of platinum may be formed on the clean surface 22 of the support 12 by applying a liquid solution of platinic chloride by any suitable means such as spraying, brushing, etc. In the present instance, the support members 12 are attached to a conveyor 26 (FIGURE 4) and dipped into the liquid solution 28. The liquid may include about 10% of platinum by weight.

After the liquid solution 28 of platinic chloride has been applied, the support member 12 may be placed in a suitable drying oven 30 and heated to a temperature on the order of about 400° F. This will cause all of the volatile materials in the solution 28 to be rapidly dissipated and leave a deposit of platinum on the surface 22. This will leave a thin film of the platinum deposited on the surface 22. If desired, a small amount of palladium ions such as 1% of palladium could be included in the platinic chloride solution 28 to facilitate the action of the metal plate in withstanding the heat. After the solution 28 of platinum or platinum in combination with palladium has been dried, the resultant deposit will normally be on the order of a few microns thick and completely cover the surface 22.

After the platinum and palladium have been deposited on the support member 12, the support member 12 may be placed in an oven or kiln 32 and heated or fired at at elevated temperature on the order of about 1,500° F. This heating or firing will be effective to cause the platinum and/or paladium to become physically bonded to the support member 12. This is illustrated in the flow chart shown in FIGURE 8. This will provide a resultant film 34 that is impervious and tenaciously adheres to the support member 12.

After the heating of the support member 12 in the kiln 32 and the subsequent cooling thereof, the resultant film 34 will be chemically inert and will also prevent any further oxidation of the support member 12 or permit any contaminants to be released from the support member 12.

This is important in insuring that the final layer of ceramic dielectric material will have a firm bond on the metal plate. Also, since the film 34 is impervious, it will be effective to form a barrier that will prevent the contaminating materials such as nickel flowing through the film 34.

Following the depositing and firing of the chemically inert film 34, a dielectric may be applied thereto. Although a wide variety of dielectric materials are suitable for this purpose, it has been found that a ceramic such as set forth in Table I below is particularly well suited for this purpose:

*Table I*

| Material: | Percentages |
| --- | --- |
| Barium titanate ($BaTiO_3$) | 55 to 90 |
| Strontium titanate ($SrTiO_3$) | 5 to 20 |
| Barium carbonate ($BaCO_3$) | 0.5 to 3 |
| Ferrous stannate ($Fe_2SnO_5$) | 0.5 to 3 |
| Bismuth stannate | 10 to 20 |

A ceramic having a composition of this general nature has a very high dielectric constant and will permit manufacturing of capacitors having very large amounts of capacity. The ceramic materials may be vitrified on the support member 12 so as to provide a very tenacious bond. Also, the thermal coefficient of expansion of the vitrified dielectric material will be very nearly the same as the support member 12. This will permit the temperature of the capacitor 10 to vary over an extended range without causing cracking, etc. of the dielectric.

In order to prepare a dielectric material having a composition such as indicated in Table I, the various constituents are thoroughly mixed and form a very fine powder. This may be accomplished by wet milling the mixture for approximately 4 hours in a ball mill or similar device. After all of the materials in the mixture have been reduced to a sufficiently fine size, the mixture may be dried, for example, by heating. The milled and dried mixture may be sieved by being passed through a screen having a fine mesh, for example, a 40 mesh. This will be effective to permit only small particles to remain in the mixture. It is very desirable that the ceramic material be as fine and as uniformly mixed as possible.

The fine ceramic mixture may then be mixed with a suitable binder to facilitate the subsequent handling of the mixture. By way of example, a binder such as a polyvinyl alcohol solution may be mixed with the pulverized mixture. The polyvinyl alcohol may be 6% of a 10% solution of polyvinyl alcohol mixed with 100 grams of the pulverized ceramic material. The resultant mixture of pulverized particles and binder may then be passed through a second 40 mesh screen to further insure a mixture having a very fine texture.

After a fine grain ceramic mixture has been prepared, it may then be applied to the electrically conductive film 34 on the support member 12. The application of the mixture may be accomplished by pressing the mixture into slugs of suitable size and thickness. The slugs may then be applied to the electrically conductive surface 34 and attached by suitable means such as a paste. This is illustrated in the flow chart shown in FIGURE 8.

Alternatively, the ceramic mixture may be air dried. The air dried mixture may then be loaded into the hoppers 36 in the spraying apparatus 38 of FIGURE 5. The various support members 12 may then be loaded onto a conveyor belt 40 so as to pass below the nozzles 42. This will be effective to spray the ceramic material onto the support members 12. Normally, the ceramic material is applied to the electrically conductive surface 22 on the support member 10 to produce a layer 44 having a substantially uniform thickness on the order of about 0.001 inch or less.

After a layer 44 of ceramic material has been provided on the conductive film 34, it may be vitrified. This may be accomplished by placing the support member 12 and ceramic in a suitable kiln 46 such as the kiln in FIGURE 7. The temperature in the kiln 46 may be raised into a region on the order of about 2,300° F. and maintained there for an extended period of time such as 1 hour or until the ceramic has been heated to a sufficient degree to insure a complete and uniform vitrifying thereof.

It has been found desirable for the support member 12 to be loaded onto a zirconia slab 48 before being placed in the kiln 46. Such a slab 48 does not rob the ceramic material of its oxygen. As a consequence, by being positioned on the slab 48, the ceramic will remain very stable throughout the extended temperature ranges.

It will be noted that the support member 12 should be capable of safely withstanding temperatures in excess of those required to vitrify the ceramic material. Although a wide variety of materials are suitable for this purpose, as previously stated, it has been found that an Inconel alloy is well suited for this purpose. Such an alloy can withstand very high temperatures and has a thermal expansion coefficient that is compatible with that of the ceramic.

However, such alloys have very large amounts of nickel whereas the ceramic material consists principally of barium titanate. It should be noted that during the heating operation that vitrifies the ceramic and particularly when the temperature is in the region of 2,300° F., there is a tendency for various contaminants such as nickel to transfer out of the support member 12 and contaminate the barium titanate. Such contamination of the dielectric material will materially alter or completely destroy the dielectric characteristics of the ceramic. However, the electrically conductive platinum or noble metal film 34 forms an impervious barrier between the support member 12 and the dielectric material. As a consequence, even during the high temperature vitrifying operation, it will be impossible for any of the contaminating material such as nickel to reach the ceramic layer 44. This film 34 will thereby insure the dielectric material remaining stable and uncontaminated throughout the entire vitrifying operation.

After the support member 12 and dielectric material thereon have been heated to the elevated temperature for a sufficient period of time to vitrify the ceramic material, the resultant structure may be allowed to cool. Although the structure may be reduced to room temperature, it has been found advantageous to reduce the temperature to an intermediate temperature somewhere in the region of 400° F. While at this intermediate temperature, an electrically conductive film may be applied to the ceramic. By way of example, a small quantity of silver may be applied by brushing, spraying or dipping until a relatively thin electrically conductive film 50 is provided. This is illustrated in the flow chart shown in FIGURE 8. Due to the entire structure being at the intermediate temperature, the silver will be effective to flow into the surface of the dielectric layer 44 and become tenaciously bonded thereto. This silver film 50 will then form a second plate of the capacitor.

Alternatively, as seen in FIGURE 6, a roller 52 may be employed to apply the silver film 50. By employing a mask such as the screen 54, the area of the film 50 may be accurately controlled. The dimensions of the mask and the resultant film 50 may be varied to accommodate variations in the thickness of the layer 44. By changing the dimensions of the film 50, each capacitor 10 will have the same capacitance.

It will thus be seen that the capacitor 10 will include a support member 12 which has sufficient thickness to provide all of the mechanical strength required to prevent damage to the finished capacitor as a result of mechanical loads. The dielectric material or ceramic material in the layer 44 is separated from the support member 12 by an impervious film or chemically inert material or noble metal whereby the ceramic will not be contaminated. As a consequence, the two electrically conductive surfaces formed by the inert or noble metal 34 and the silver layer 50 may be separated by a minimum thickness dielectric material so that there will be a minimum space between the two plates. This will insure a maximum amount of capacity being present between the electrically conductive plates formed by the two films.

If desired, a suitable electrical lead 56 may be attached to the second plate or file 50. This lead 56 in combination with the extension 24 on the support member 12 will permit the capacitor 10 to be electrically connected into any desired electrical circuit.

While only one embodiment of the present invention is disclosed herein, it will be readily apparent to persons skilled in the art that numerous changes and modifications may be made thereto without departing from the spirit of the invention. Accordingly, the foregoing disclosure and description thereof are for illustrative purposes only and do not in any way limit the invention which is defined only by the claims which follow.

What is claimed is:
1. The method of manufacturing a ceramic capacitor including the steps of:
providing a support member of an electrically conductive alloy containing nickel and being stable over a first range of temperatures up to a predetermined temperature,
depositing a metal from a group consisting of gold, platinum and palladium on one surface of said support member,
heating the support member and noble metal to a second temperature which is in said range and less than said predetermined temperature to fuse the noble metal onto the said surface of the support and form an electrically conductive film that is impervious to nickel and is electrically conductive,
depositing a pulverized ceramic including barium titanate onto the film of noble metal,
firing the ceramic layer to a temperature less than the second temperature to vitrify the ceramic into a dielectric layer, depositing an electrically conductive material on the layer of vitrified ceramic, and heating said electrically conductive material to a temperature less than the second temperature to form a second electrically conductive film.

2. A method of manufacturing a ceramic capacitor including the steps of:

providing a support member including an alloy which is stable over a temperature range that extends to a particular temperature having a relatively high value, depositing a metal from a group consisting of gold, platinum and palladium on one surface of said support member, heating the support member and said noble metal to a second temperature which is in said range and less than said particular temperature to fuse the noble metal and forming an electrically conductive film and forming a barrier impervious to contaminants in the support member, depositing a layer of ceramic material on the fused layer of noble metal, firing the ceramic layer at a temperature less than the second temperature to vitrify the ceramic and fuse the ceramic to the electrically conductive film, depositing an electrically conductive material on the vitrified ceramic material, and heating the electrically conductive material to a temperature in said range and less than said second temperature to fuse the electrically conductive material onto the ceramic layer in the form of a second electrically conductive film.

3. The method of manufacturing a ceramic capacitor including the steps of:

providing a support member including an alloy which is stable over a temperature range that extends up to a particular temperature having a relatively high value, providing a film of metal from a group consisting of gold, platinum and palladium on one surface of said support to form an electrically conductive film, providing a layer of pulverized ceramic material on the noble metal, said film of noble metal forming an impervious barrier that maintains the ceramic material chemically isolated from contaminating substances in the high temperature alloy, fusing the ceramic layer to the film of noble metal at a temperature that is in said range and below said high temperature to form a vitrified dielectric layer, depositing an electrically conductive material on the vitrified ceramic material, and heating said electrically conductive material to a sufficient temperature to bond said electrically conductive material to the ceramic layer in the form of a second electrically conductive film separated from the first film by the thickness of the dielectric layer.

4. The method of manufacturing a ceramic capacitor including the steps of:

providing an electrically conductive support member that is stable over a particular temperature range and that has properties of emitting contaminants in the particular temperature range, providing on said support member a first electrically conductive film having properties of serving as a barrier to prevent the passage from the support member of the contaminants in the support member, the first electrically conductive film being selected from a group consisting of gold, platinum and palladium, depositing a layer of ceramic material on the first electrically conductive film, fusing the ceramic layer to the first electrically conductive film at a temperature that is in said particular temperature range to provide a vitrified dielectric layer, and providing a second film of electrically conductive material on the vitrified ceramic layer, said first and second electrically conductive films being separated from each other by the thickness of said ceramic layer.

5. The method of manufacturing an electrical component including the steps of:

providing an electrically conductive support member including a high temperature alloy that remains stable over an extended range of high temperatures and that has properties of emitting contaminants especially at the extended temperatures, providing on at least one surface of said support member a first electrically conductive film having properties of serving as a barrier to the passage of the contaminants from the support member, the first electrically conductive film being selected from a group consisting of gold, platinum and palladium, fusing a thin film of ceramic material to said electrically conductive film at a temperature that is within said extended range to form a vitrified dielectric layer, and depositing a second electrically conductive film on said ceramic film whereby the two electrically conductive films are separated from each other by the thickness of the ceramic film.

6. The method of manufacturing an electrical component including the steps of:

providing an electrically conductive support member having a sufficient thickness to provide a mechanical support for the component and having properties of emitting contaminants, bonding on at least one surface of said support a first electrically conductive thin film having properties of serving as a barrier against the passage of the contaminants from the support member, the first electrically conductive film being selected from a group consisting of gold, platinum and palladium, bonding a thin film of a dielectric material on said first electrically conductive film, and providing a second electrically conductive thin film on said ceramic layer, said second electrically conductive film being separated from the first electrically conductive film by the thickness of the ceramic film.

7. The method of manufacturing an electrical component including the steps of:

providing an electrically conductive support member having properties of emitting contaminants, providing on said support member a first electrically conductive film having properties of serving as a contaminant to the passage of the contaminants from the support member, the first electrically conductive film being selected from a group consisting of gold, platinum and palladium, fusing on said first electrically conductive film a thin ceramic material having dielectric properties, and providing a second electrically conductive film on said ceramic film, said second electrically conductive film being separated from the first electrically conductive film by the thickness of the ceramic film.

8. The method of manufacturing an electrical component including the steps of:

providing an electrically conductive support member having properties of emitting contaminants, providing on said support member a first electrically conductive film having properties of serving as a barrier to the passage of the contaminants from the support member, the first electrically conductive film being selected from a group consisting of gold, platinum and palladium, bonding the first electrically conductive film to the support member, providing on said electrically conductive film a thin film of a ceramic material having dielectric properties, fusing the thin film of ceramic material to the first electrically conductive film, providing a second electrically conductive film on said film of ceramic material whereby said first and second electrically conductive films are separated from each other by the thickness of the ceramic film, and fusing the second electrically conductive film to the ceramic film.

9. A method of fabricating at least one ceramic capacitor including the steps of:

providing an electrically conductive support member including nickel and having rigid structural characteristics which remain substantially stable through an extended range of temperatures to a predetermined elevated temperature, providing on at least one side of the support member a material having properties of serving as a barrier to prevent the transfer of the nickel past the barrier, the barrier material being selected from a group consisting of gold, platinum and palladium, providing on the barrier material a pulverized ceramic including barium titanate, firing the pulverized ceramic to a temperature less than the predetermined temperature to fuse the ceramic into a dielectric layer, and applying a film of electrically conductive material to the ceramic layer in spaced relation to the support member and to the barrier material.

10. The method set forth in claim 9 where the barrier material constitutes a noble metal and where the noble metal is bonded to the support member at a temperature of approximately 1500° F. and where the pulverized ceramic is fired to the noble metal at a temperature of approximately 2300° F.

11. A ceramic capacitor including the combination of:

a support member forming the main structural support of the capacitor, said support member including an electrically conductive material which is effective to retain its structural strength through an extended range of temperatures to a predetermined elevated temperature and which has properties of emitting contaminants especially at elevated temperatures in the extended range, a film of an electrically conductive metal from a group consisting of gold, platinum and palladium, said film being bonded to the surface of said support member to prevent the transfer of contaminants from the support member through the film, said film forming one plate of the capacitor, a vitrified layer of ceramic bonded to the film of noble metal and having a predetermined dielectric constant, and a metallic film disposed on the ceramic film and separated from the first conductive film by the thickness of said ceramic film to form the second plate of the capacitor.

12. A ceramic capacitor including the combination of:

a support member forming the main structural support of the capacitor, said support member including a high temperature electrically conductive material which is effective to retain its structural strength through an extended range of temperatures to a particular elevated temperature and which has properties of emitting contaminants especially at the elevated temperatures in the extended range, a film of electrically conductive metal bonded to the surface of said support member and forming a first plate of the capacitor, said film having properties of serving as a barrier to the passage of the contaminants in the support member, said film being selected from a group consisting of gold, platinum and palladium, a layer of a dielectric ceramic bonded to the electrically conductive film and separated from the contaminants in the support member by the film, said ceramic layer forming the dielectric spacer in the capacitor for separating the two plates of the capacitor, a metallic film bonded to the ceramic layer, said metallic film forming the second plate of the capacitor and being separated from the first plate by the thickness of said ceramic layer, first terminal means electrically connected to the first plate to form one terminal of the capacitor, and second terminal means electrically connected to the second plate so as to form a second terminal of the capacitor.

13. A ceramic capacitor including the combination of:

a support member forming the main structural support of the capacitor, said support member including a high temperature electrically conductive material which is effective to retain its structural strength through an extended range of temperatures to a particular elevated temperature and which has properties of emitting contaminants especially at elevated temperatures in the extended range, an electrically conductive film bonded to the surface of said support member and forming one plate of the capacitor, said film having properties of serving as a barrier to the contaminants in the support member and effective to prevent the transfer of the contaminants from the support member through the film, said film being selected from a group consisting of gold, platinum and palladium, a layer of ceramic material bonded to the electrically conductive film and separated from the contaminants in the support member by the film, said ceramic layer forming the dielectric spacer in the capacitor, and a metallic film disposed on the ceramic layer and separated from the first conductive film by the thickness of said ceramic film to form the second plate of the capacitor.

14. A ceramic capacitor including the combination of:

electrically conductive support means of a high temperature alloy including nickel, said member forming the main structural element of the capacitor and having properties of emitting contaminants especially at elevated temperatures, an electrically conductive barrier on one side of said support means, said barrier being impervious to the contaminants in the support means to prevent the transfer of the contaminants through the barrier, said electrically conductive barrier being selected from a group consisting of gold, platinum and palladium, a vitrified layer of ceramic on the barrier and isolated from the contaminants in the support means by the film, said layer including barium titanate and forming a dielectric spacer in the capacitor, an electrically conductive film on the ceramic layer and forming a second plate of the capacitor, and terminals electrically connected to the electrically conductive plates.

15. A ceramic capacitor including the combination of:

electrically conductive support means forming the main structural element of the capacitor and having properties of emitting contaminants, electrically conductive barrier means on one side of said support member, said barrier means having properties of serving as a barrier to the passage of the contaminants in said support member and having properties to serve as one plate of the capacitor, said electrically conductive barrier means being selected from a group consisting of gold, platinum and palladium, a layer of ceramic material vitrified onto the barrier means, said layer being separated from the contaminants in the structural member by the electrically conductive barrier, and an electrically conductive film on the ceramic layer and spaced from the electrically conductive barrier by the ceramic layer, said film forming a second plate of the capacitor.

16. A ceramic capacitor including the combination of:
electrically conducitve support means forming the main structural element of the capacitor and having properties of emitting contaminants,
electrically conductive barrier means bonded to one side of said support member, said barrier means being selected from a group consisting of gold, platinum and palladium contaminants in said support member,
a layer of ceramic material fused to the barrier means, said layer being separated from the contaminants in the structural member by the barrier means,
an electrically conductive film bonded to the ceramic layer and spaced from the barrier means by the ceramic layer, said film forming a second plate of the capacitor, and
terminal means independently connected to the two plates of the condenser.

17. A ceramic capacitor including the combination of:
an electrically conductive support member forming the main structural element of the capacitor and having properties of emitting contaminants,
a thin film of an electrically conductive barrier material bonded to one side of said support member, said barrier having properties of preventing the passage of the contaminants in said support member, the barrier material including a noble metal,
a thin film of ceramic material fused to the barrier material and forming a dielectric spacer, and
an electrically conductive thin film fused to the ceramic layer and spaced from the barrier material by the ceramic to form a second layer of the capacitor layer.

References Cited by the Examiner
UNITED STATES PATENTS

| | | | |
|---|---|---|---|
| 2,088,949 | 9/1937 | Fekete | 317—258 X |
| 2,239,954 | 4/1941 | Fanselau | 117—217 |
| 2,759,854 | 9/1956 | Kilby. | |
| 2,893,908 | 7/1959 | Antfinger | 156—90 |
| 3,130,475 | 4/1964 | Reith | 317—261 |

LARAMIE E. ASKIN, *Primary Examiner.*

JOHN F. BURNS, ROBERT K. SCHAEFER,
*Examiners.*

E. GOLDBERG, *Assistant Examiner.*